United States Patent [19]

Tricon

[11] 3,915,010
[45] Oct. 28, 1975

[54] BELLOWS ASSEMBLY

[75] Inventor: Alfred J. Tricon, Houston, Tex.

[73] Assignee: Sperry-Sun Well Surveying Company, Sugar Land, Tex.

[22] Filed: Apr. 22, 1974

[21] Appl. No.: 462,914

[52] U.S. Cl. .......................... 73/410; 92/91; 92/92
[51] Int. Cl.² .......................................... G01L 7/06
[58] Field of Search ............ 73/409, 410; 92/91, 92; 138/30

[56] References Cited
UNITED STATES PATENTS

| | | | |
|---|---|---|---|
| 2,378,517 | 6/1945 | Trautman | 138/30 |
| 3,195,577 | 7/1965 | Greer | 138/30 |
| 3,442,292 | 5/1969 | Jacuzzi | 138/30 |
| 3,561,330 | 2/1971 | Rich | 73/410 |
| 3,794,078 | 2/1974 | Mercier | 138/30 |

FOREIGN PATENTS OR APPLICATIONS

| | | | |
|---|---|---|---|
| 6,701,749 | 8/1968 | Netherlands | 138/30 |

*Primary Examiner*—Donald O. Woodiel
*Attorney, Agent, or Firm*—George L. Church; Donald R. Johnson; Macka L. Murrah

[57] ABSTRACT

A bellows assembly for use in high pressure environments utilizes a bellows having a closed end with a conical, internal core and an open end that is secured about a bulbous-shaped fitting.

17 Claims, 3 Drawing Figures

BELLOWS ASSEMBLY

BACKGROUND OF THE INVENTION

The invention relates to bellows for use in high pressure environments and is particularly suited for use in sensing pressures in boreholes.

The pressures in boreholes is often an important parameter in the analysis of underground formations. The petroleum industry, for example, often uses borehole pressures to solve certain production and reservoir engineering problems. In secondary recovery operations in which fluid is injected into a petroleum-bearing formation, the pressure in boreholes drilled into the formation at selected locations can be used to determine such data as the amount of fluid that must be injected, the location of flood fronts, and the efficiency with which the flood fronts are sweeping the formation. In other production operations, borehole pressures can be used to indicate well productivity potential, the occurrence of wellbore damage, and operational problems in pumping wells.

The borehole pressures may be determined either continuously with a permanent in-hole instrument or at periodic intervals by temporarily inserting instruments into the borehole. Periodic measurements are often the more expensive of the two methods since the well must normally be shut-in or the producing equipment removed when the instrumentation is inserted. Thus, permanent instrumentation is preferable if it is available.

One such permanent device operates with a downhole pressure transducer having an electronic scanning system for converting the downhole pressure into data transmittable to the surface by means of a conductor cable. The cable is normally applied or attached to the outside of the tubing with the transducer being mounted on the lower end of the tubing strip. The electronics in such a system is expensive and produces many maintenance problems. In addition, data that is obtained by an electronic system using scanners and transmitting over conductors suffers from poor resolution and thus may not be as accurate as that needed to determine changes in reservoir conditions. Further, conductor cable deteriorates in the chemically hostile environment of boreholes. In addition the temperature limitations of electronic instrumentation are sometimes exceeded in the high temperatures of the wells.

A new and improved apparatus for remotely detecting pressure was disclosed by B. W. McArthur in an application entitled "METHOD AND APPARATUS FOR MEASURING PRESSURE RELATED PARAMETERS", Ser. No. 414,062 McArthur uses in one embodiment a downhole bellows connected to the surface by a conduit. The bellows and conduit are filled with a fluid from the surface and its pressure is increased until it reaches the pressure of the borehole and inflates the bellows. The pressure of the borehole is determined by monitoring the behavior of the bellows as reflected in the pressure of the fluid in the conduit.

A bellows which is used in the pressure measuring apparatus disclosed by McArthur should be able to operate at pressure differentials in excess of 2,000 psi. Under these conditions several problems can arise, including bellows extrusions and closed end buckling failure. The extrusion problem occurs at the open end of the bellows where the bellows is attached to a fitting. The connection is generally made by squeezing the bellows material between two pieces of metal to form a fluid tight seal. However, at extremely high pressures there is a tendency for the bellows to extrude from between the two holding members and become detached. The closed end buckling problem occurs when the bellows is in a highly deflated state. Under these conditions, there is a tendency for the bellows to tear, caused by overextension of the bellows at the closed end.

It is therefore an object of the invention to provide a new and improved bellows assembly, capable of operating in the environment of boreholes.

SUMMARY OF THE INVENTION

With this and other objects in view, the invention contemplates a bellows having an inwardly-directed, pointed core on one end and open on the other end.

In another aspect the invention uses a clamp for the open end of the bellows that includes a bulbous fitting over which the bellows is placed. A conforming nut wedges between the bellows-covered fitting and a lateral wall to secure the bellows in place.

BRIEF DESCRIPTION OF THE DRAWINGS

The invention may be more fully understood by referring to the exemplary embodiments illustrated in the following drawings.

DESCRIPTION OF THE PREFERRED EMBODIMENTS

Figure 1:
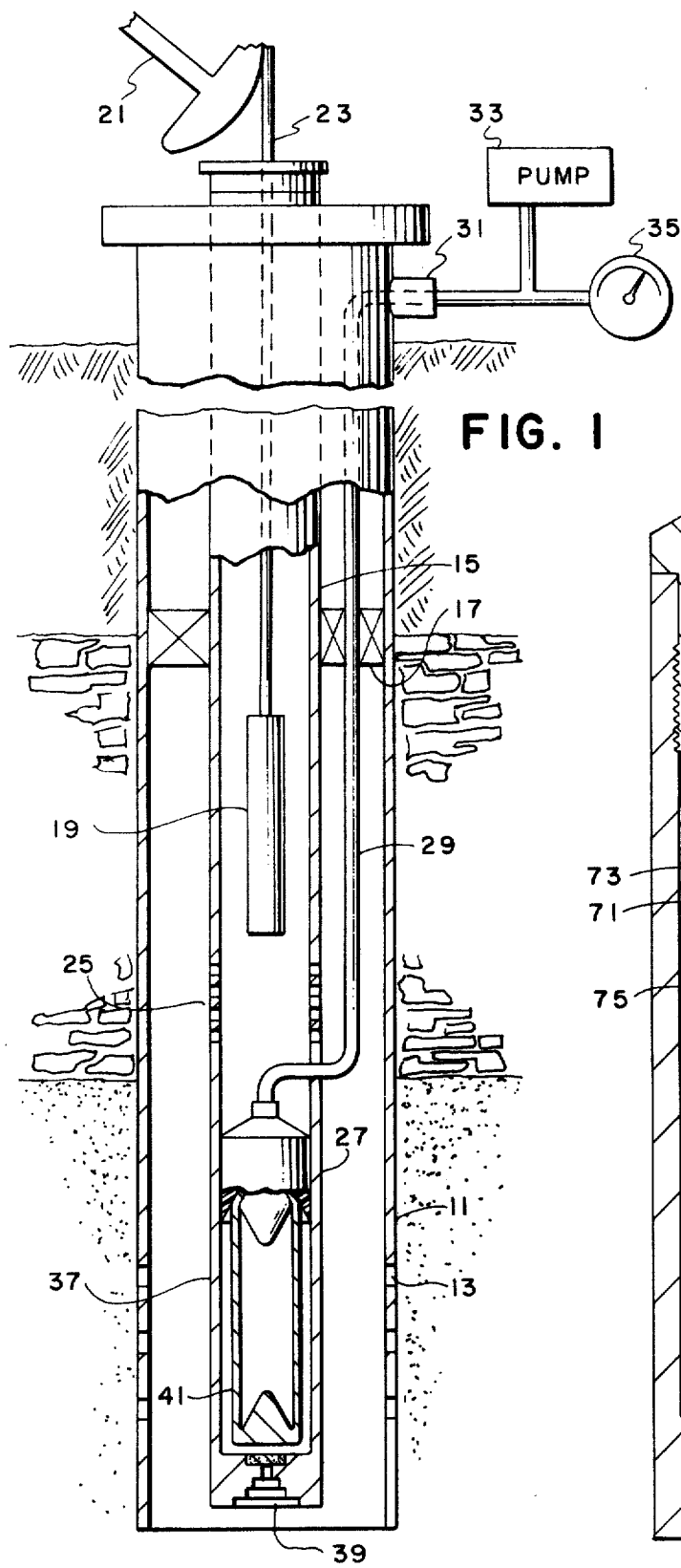
FIG. 1 is a schematic drawing of the wellbore and production equipment including a pressure measuring system in which the invention may be used.

In FIG. 1 a wellbore is shown traversing underground formations. Production equipment for producing fluids from the formations is shown schematically and includes a casing 11 in the wellbore having perforations 13 at its lower end to permit the entry of formation fluid. A tubing string 15 extends from the wellhead at the surface downwardly within the borehole to the lower end thereof. A packer 17 is positioned about the tubing and extends between the tubing and the casing of the wellbore. A downhole pump 19 is schematically shown positioned within the tubing and is connected to a pumping unit 21 at the surface by means of rods 23. A perforated section 25 in the tubing string permits the entry of wellbore fluids for pumping to the surface. A downhole pressure measuring device 27 is shown positioned on the lower end of the tubing. A small diameter tube 29 extends from within the pressure measuring device to the outside of the tubing string and to the surface where exits from the side of the casing through a fitting 31. Connected to the tube 29 at the surface is a fluid pumping device 33 and a pressure indicating device 35.

The downhole pressure measuring device 27 is attached to the bottom end of the tubing string and includes an outer housing 37 having a fluid inlet port 39 at its lower end for permitting the entry of wellbore fluids. Tube 29, which extends to the surface, communicates with the upper end of the pressure measuring apparatus 27. A bellows 41 is positioned within the interior of the bore of the housing. The upper end of the bellows is connected to the tube 29 with the interior of the bellows communicating with the tube. The bellows may be composed of a rubber or metallic material which is constructed to permit its flexible expansion and compression.

In the operation of the apparatus of FIG. 1, fluid is introduced into tube 29 at a constantly increasing rate by means of pump 33, which transmits the fluid to bellows 41. The pressure of the fluid in the bellows, which is reflected to the surface through tube 29, is monitored by gauge 35. The bellows pressure increases at the same rate as the pressure supplied by pump 33 until it approaches the borehole pressure. At that point the bellows begins to expand, which slows the rate of pressure increase in the bellows. When the bellows surpasses the borehole pressure, it will fully inflate and the rate of pressure increase will again rise. The pressure in the borehole is thus determined by noting the pressure at which the bellows begins to expand, i.e., the pressure at which gauge 35 records a change from a more rapidly increasing rate of pressure change to a more slowly increasing rate.

Figure 2:
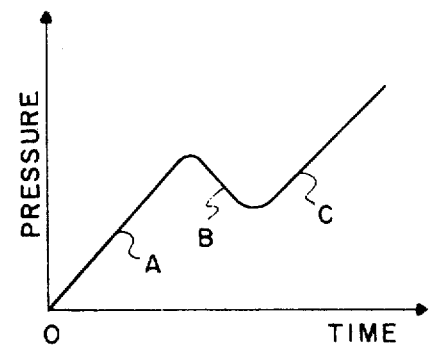
FIG. 2 is a graph that illustrates the method of determining downhole pressure.

FIG. 2 illustrates the behavior of the pressure in bellows 41. The curved plotted in FIG. 2 shows the variation of pressure with time and has several distinct portions. Portion A occurs as bellows pressure is increased from zero and approaches borehole pressure. When bellows pressure reaches borehole pressure and the bellows begins to expand, the curve enters portion B in which either a zero increase or a decrease in rate of pressure change will be observed. After the bellows has fully inflated, the curve enters position C, which again shows an increasing rate of pressure change.

Figure 3:
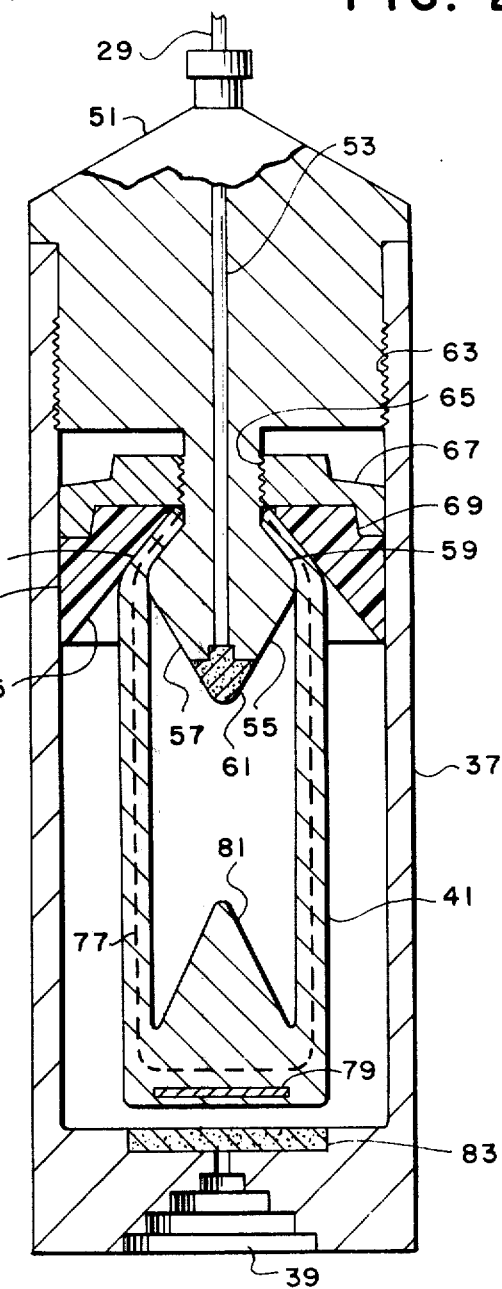
FIG. 3 is a schematic drawing of the bellows assembly in accordance with the invention.

In FIG. 3 an end body 51 fits within a housing 37 by means of threads 63. Housing 29 is provided at its lower end with a porous plug 83 and a port 89 to provide communication with the downhole formation. End body 51 is provided with a passage 53 which leads from tubing 29 through end body 51 to a bulbous fitting 55.

Fitting 55 may be composed of two conically shaped portions 57 and 59 having their bases joined. Fitting 55 has a porous tip 61 in communication with passage 53. Above end fitting 55 there is a threaded portion 65 to mate with a nut 67. Nut 67 is provided with a recess 69 to accomodate a ring 71. Ring 71, which may be composed of plastic or other suitable material, has a central void 73 shaped to conform to fitting 55 and a cross section 75 shaped to fit between fitting 55 and housing 57. The shape of ring 71 performs two functions. First, it transmits the force from nut 67 to squeeze the sac-shaped bellows 11 against surface 50 to provide a fluid tight seal between the bellows 41 and such surface. Second, it expands against the inner surface of housing 27 to eliminate any extrusion path for bellows 41. Alternatively the nut 67 and the ring 71 may be built as a single piece.

The bellows 41 may be provided with a layer of reinforcement material 77, such as cotton. The bellows may also have at its lower end a metallic reinforcement 79. In addition, it may also have an internal core 81 to prevent tearing due to closed end buckling.

While particular embodiments of the invention have been shown and described, it is apparent that minor changes and modifications may be made without departing from the true scope and spirit of the invention. It is the intent of the appended claims to cover all such changes and modifications.

What is claimed is:

1. A bellows assembly for use in a borehole pressure measuring system, comprising: a housing; a bellows end fitting attached inside the housing and having a bulbous portion; and a clamp having a concave shaped center void with flanges to mate about the end fitting over the bellows and a periphery having a wedged-shaped cross-section of a width sufficient to contact the side of the housing.

2. The assembly of claim 1 further including a threaded nut above the clamp in slidable contact therewith and mated to a threaded portion of the end fitting above the concave shaped portion.

3. A bellows assembly for use in a borehole pressure measuring system comprising: a housing; a bellows inside the housing for inflation and deflation; an inwardly-extending, conically-shaped core at a point in the bellows where folding occurs during deflation; and means in the housing for clamping the open end of the bellows to the housing.

4. A bellows assembly for use in a borehole pressure measuring system comprising: a housing; a flexible bellows inside the housing having an inwardly-extending, conically-shaped core at its closed end; a bellows end fitting attached inside the housing and having a portion with the shape of two cones with their bases joined; and a clamp having a conical central void to mate with the end fitting over the bellows and a periphery having a wedge-shaped cross-section of a width sufficient to contact the side of the housing.

5. The assembly of claim 4 further including a threaded nut above the clamp in slidable contact therewith and mated to a threaded portion of the end fitting above the conical portion.

6. An inflatable-deflatable bellows for use in a borehole pressure measuring system comprising: a cylindrical upper portion having thin, flexible walls and an open upper end; and a lower end portion having an area in which folding occurs during deflation; an inwardly-extending, conical core in said area.

7. The bellows of claim 6 further including a flexible reinforcing material in the walls of the upper portion and in the lower portion.

8. The bellows of claim 6 further including a rigid reinforcing plate from the lower end portion positioned normal to the axis of the conically shaped portion.

9. A bellows assembly for use in a borehole pressure measuring system, comprising: a cylindrical housing; a bellows inside the housing comprising a cylindrical upper portion with thin, flexible walls and having an open upper end and a lower end portion having an inwardly extending, conical core whose axis coincides with the axis of the upper portion; a bellows end fitting attached inside the housing having a bulbous portion; and a clamp having a concave central void to mate with the end fitting over the bellows and a periphery having a wedge-shaped cross-section of a width sufficient to contact the side of the housing.

10. The assembly of claim 9 further including a threaded nut above the clamp in slidable contact therewith and mated to a threaded portion of an end fitting above the concave portion.

11. The bellows assembly of claim 10 further including a flexible reinforcing material in the walls of the upper portion and on the lower end portion.

12. The bellows assembly of claim 11 further including a rigid reinforcing plate in the lower end portion positioned normal to the axis of the conically shaped portion.

13. A bellows assembly comprising: a sac-shaped bellows having an inwardly-extending core on its closed end; and a clamp for the open end of the bellows, said clamp having a bulbous member over which the bellows fits, a retainer surrounding the bulb and spaced therefrom, and a collar about the bulb having a wedged cross-section and fitting tightly between the retainer wall and the bellows covered bulb.

14. A bellows assembly comprising: a sac-shaped bellows having an inwardly-extending core on its closed end; and a clamp for the open end of the bellows, said clamp having a bulbous member the shape of cones with their bases joined, over which the bellows fits, a retainer surrounding the bulb and spaced therefrom, and a collar about the bulb having a wedged cross-section and fitting tightly between the retainer wall and the bellows covered bulb.

15. The assembly of claim 14 wherein the core is conical.

16. Means for securing the open end of a bellows, comprising: a bulb which fits into the bellows; a retainer attached above the bulb and extending downwardly to surround the bulb; and a collar about the bulb having a wedged cross-section and fitting tightly between the retainer and the bellows bulb.

17. Means for securing the open end of a bellows, comprising: a bulb, in the shape of cones with their bases joined, which fits into the bellows; a retainer attached above the bulb and extending downwardly to surround the bulb; and a collar about the bulb having a wedged cross-section and fitting tightly between the retainer and the bellows bulb.

* * * * *